(12) United States Patent
Sudar

(10) Patent No.: US 7,866,707 B2
(45) Date of Patent: Jan. 11, 2011

(54) ANCHORING ELEMENT FOR PIPE COUPLINGS

(75) Inventor: Damir Sudar, Bad Ragaz (CH)

(73) Assignee: Straub Werke AG, Wangs (CH)

( * ) Notice: Subject to any disclaimer, the term of this patent is extended or adjusted under 35 U.S.C. 154(b) by 0 days.

(21) Appl. No.: 12/560,430

(22) Filed: Sep. 16, 2009

(65) Prior Publication Data

US 2010/0032942 A1 Feb. 11, 2010

Related U.S. Application Data

(63) Continuation of application No. 11/909,036, filed as application No. PCT/IB2006/050807 on Mar. 15, 2006, now abandoned.

(30) Foreign Application Priority Data

Mar. 22, 2005 (CH) .................................... 485/05

(51) Int. Cl.
*F16L 17/00* (2006.01)
(52) U.S. Cl. ...................................... 285/112; 285/104
(58) Field of Classification Search ................... 29/557, 29/558, 527.6, 888.3, 525.01; 285/340, 112, 285/95, 417, 104, 105
See application file for complete search history.

(56) References Cited

U.S. PATENT DOCUMENTS

| 1,931,922 A | | 10/1933 | Damsel et al. |
| 2,147,353 A | | 2/1939 | Scholtes |
| 3,222,769 A | * | 12/1965 | Le Plae ........................ 29/413 |
| 3,271,053 A | | 9/1966 | Kurachi |
| 4,181,329 A | | 1/1980 | Helm |
| 4,268,072 A | | 5/1981 | Straub |
| 4,339,860 A | * | 7/1982 | Hayashi ........................ 29/413 |
| 4,508,369 A | | 4/1985 | Mode |
| 4,616,858 A | | 10/1986 | Sauer |
| 4,626,002 A | | 12/1986 | Hagemeister et al. |
| 4,676,856 A | * | 6/1987 | Shigeki et al. ............... 156/201 |
| 4,717,179 A | | 1/1988 | Haberstock et al. |

(Continued)

FOREIGN PATENT DOCUMENTS

DE 2637044 A1 2/1978

(Continued)

OTHER PUBLICATIONS

ISR-PCT International Search report from parent Application PCT/IB2006/050807, original in German, English translation included; 6 pp. total.

(Continued)

*Primary Examiner*—Aaron Dunwoody
(74) *Attorney, Agent, or Firm*—Matthew B. Dernier, Esq.; Gibson & Dernier LLP

(57) ABSTRACT

A seal anchor for pipe couplings suited for frictional connection of smooth-ended pipes. The seal anchor has a housing, and at least one sealing element, for example of rubber-elastic material, arranged therein. The anchor may be of generally L-shaped cross-section and has a first limb extending in the axial direction and a second limb extending at an acute angle to the first limb. The anchoring element blank is provided with slots which run across its width in the longitudinal direction relative to the limbs and between the limbs. One or more webs span the slots to join adjacent limbs.

20 Claims, 3 Drawing Sheets

U.S. PATENT DOCUMENTS

| | | | |
|---|---|---|---|
| 4,729,582 A | | 3/1988 | Zeidler |
| 4,830,898 A | * | 5/1989 | Smith .................. 428/122 |
| 4,842,309 A | | 6/1989 | LaVene et al. |
| 4,930,791 A | | 6/1990 | Ungchusri et al. |
| 5,160,179 A | | 11/1992 | Takagi |
| 5,249,353 A | * | 10/1993 | Kranz ..................... 29/446 |
| 5,273,322 A | | 12/1993 | Straub |
| 5,310,223 A | | 5/1994 | Straub |
| 5,333,916 A | | 8/1994 | Burkit et al. |
| 5,752,345 A | * | 5/1998 | Bright et al. ............ 49/490.1 |
| 5,816,627 A | | 10/1998 | Readman |
| 5,931,476 A | | 8/1999 | Ungchusri et al. |
| 6,179,347 B1 | | 1/2001 | Dole et al. |
| 6,279,963 B1 | | 8/2001 | Hulsebos |
| 6,312,025 B1 | | 11/2001 | Wolfsdorf |
| 6,367,802 B1 | | 4/2002 | Knapp |
| 6,371,491 B1 | | 4/2002 | Schultz et al. |
| 6,446,337 B1 | * | 9/2002 | Halm et al. ............ 29/890.052 |
| 6,499,771 B1 | | 12/2002 | Snyder et al. |
| 6,684,481 B2 | * | 2/2004 | Kullmer .................. 29/558 |
| 6,742,255 B1 | * | 6/2004 | Frappier ................ 29/888.3 |
| 7,174,617 B2 | * | 2/2007 | Wright .................. 29/428 |
| 7,316,429 B2 | | 1/2008 | Viegener |
| 7,721,400 B2 | * | 5/2010 | Parent et al. ........... 29/402.09 |
| 2008/0185838 A1 | | 8/2008 | Sudar |

FOREIGN PATENT DOCUMENTS

| | | |
|---|---|---|
| DE | 10302598 A1 | 8/2004 |
| EP | 0738850 A1 | 10/1996 |
| EP | 1888960 B1 | 7/2009 |
| FR | 2822521 A | 9/2002 |
| GB | 2182743 A | 5/1987 |
| GB | 2321685 A | 9/1998 |

OTHER PUBLICATIONS

IPRP-PCT International Preliminary Report on Patentability—from parent Application PCT/IB2006/050807, original in German, English translation included; 18 pp. total.

* cited by examiner

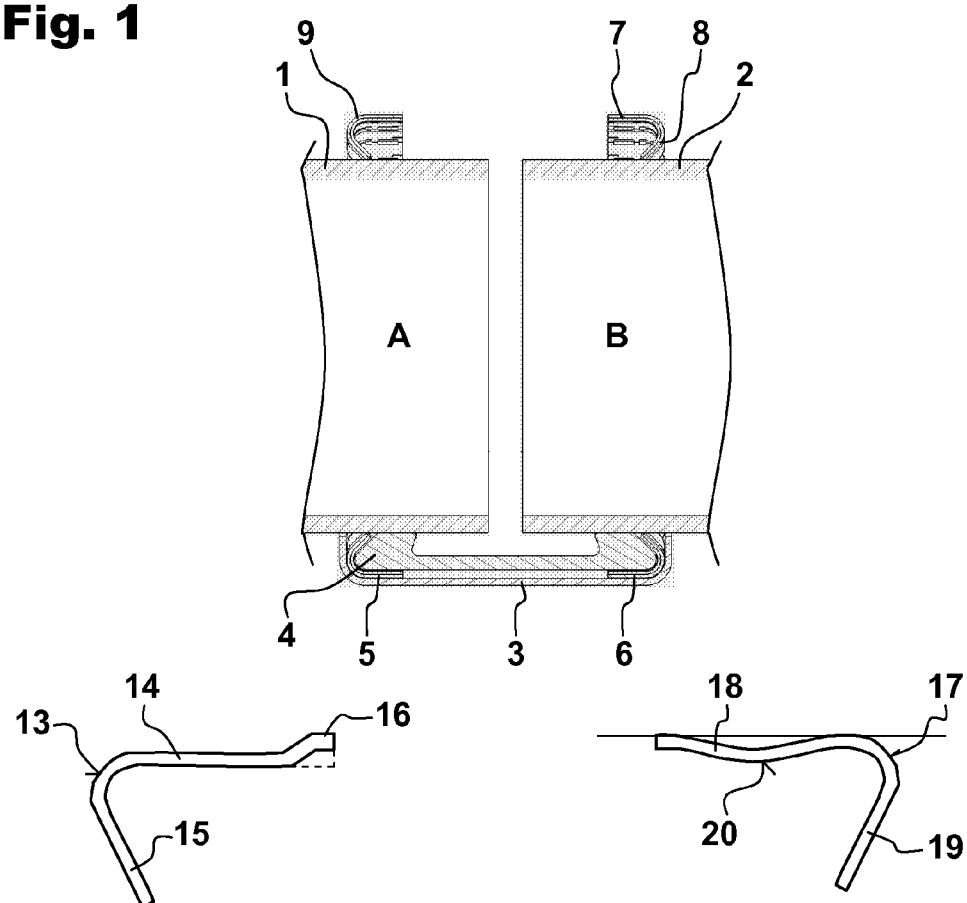
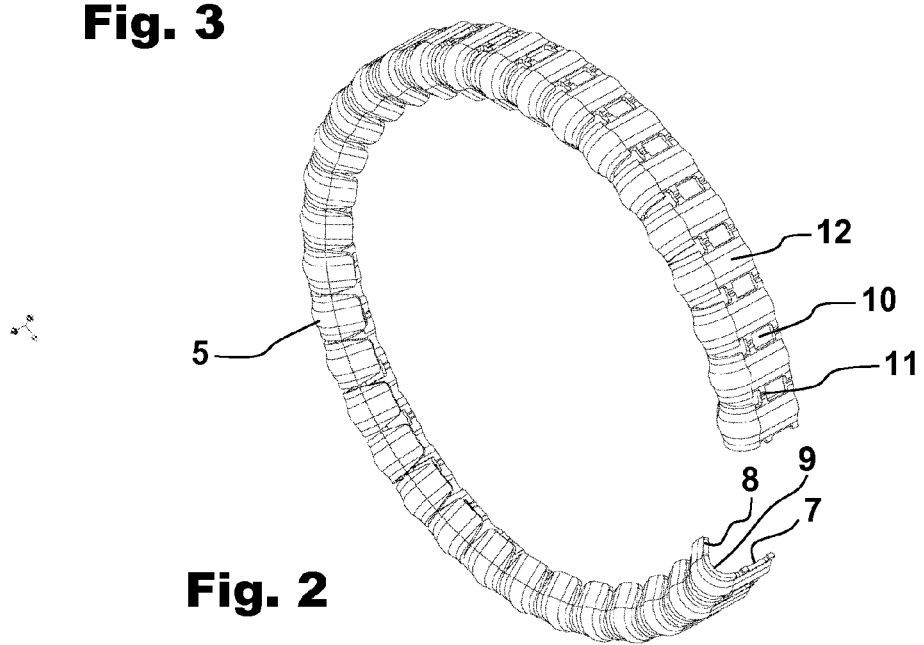

ANCHORING ELEMENT FOR PIPE COUPLINGS

This application claims benefit as a Continuation of U.S. application Ser. No. 11/909,036 filed on Oct. 30, 2007, which is a 35 U.S.C. 371 national stage entry of PCT International App. No. PCT/IB2006/050807 filed on Mar. 15, 2006, claiming benefit of priority to Swiss application no. 485/05 filed on Mar. 22, 2005; the entirety of prior U.S. application Ser. No. 11/909,036 and of PCT International Application Ser. No. PCT/IB2006/050807 are expressly incorporated herein by reference, for all intents and purposes, as if identically set forth herein.

BACKGROUND

The invention relates to anchoring elements for pipe couplings for frictional connection of smooth-ended pipes, having a housing, at least one sealing element arranged therein and comprising rubber-elastic material, the anchoring element being used for engaging at least one of the pipes to be connected, being formed substantially L-shaped in cross-section and having a first limb extending in the axial direction and a second limb extending at an acute angle to the first limb and the transition between the two limbs preferably being in the form of a radius, the second limb being provided at least partly with slots running in the longitudinal direction, and the slots extending beyond the transition or beyond the radius into the first limb.

Anchoring elements for pipe couplings transmit the forces acting as a result of internal pressure or from the outside on a pipeline between the individual pipes of the pipeline. These are primarily tensile or compressive forces. Depending on the loading of the pipe connections, however, transverse forces or torsional moments may also occur.

The production of the anchoring elements is very complicated since as a rule they have to be produced from spring steel and have to be cold-formed.

GB2321685 discloses anchoring elements which are formed substantially L-shaped in cross-section. The first limb extends approximately in the axial direction and a second limb at an acute angle thereto. The second limbs are provided with slots emanating from the free end. These slots give rise to individual teeth which can engage the surface of the pipes to be connected. However, since the slots extend only over a part of the length of the second limbs, the flexibility of the teeth is relatively low.

In particular, in the case of ovalness of the pipes or an unintentionally skew-mounted pipe coupling, the teeth cannot optimally engage the pipe.

SUMMARY

It is an object of the invention to provide anchoring elements for pipe couplings, which anchoring elements permit high flexibility and secure anchoring on the pipe.

According to the invention, this is achieved if the slots extend over the total width of the anchoring element and have at least one web running substantially transversely to the slot. The slots extending beyond the transition or beyond the radius give rise to a multiplicity of individual teeth which are deformable virtually independently of one another. The entire anchoring element is thus very flexible and can be produced and mounted in a simple manner. In addition, the flexibility or deflection of the individual teeth can be limited thereby.

The webs are advantageously elastically or plastically deformable and can, for example, be compressed or extended. By the deformation of the webs, the entire anchoring element is also radially deformable.

To ensure that the limbs are dimensionally stable, it is expedient for them to have profiles in cross-section at least over a part of their length. Such profiles may be in the form of ribs or continuous beads.

The first limbs are advantageously at least partly curved in the axial direction towards the pipe axis. As a result of this curvature, the free end of the first limbs is directed radially outwards. These ends can thus come into contact with the inside of the housing or can engage therewith by friction. Thus, for example, undesired relative rotations between the anchoring element and the housing can be avoided.

An improvement of the contact between the anchoring element and the housing is advantageously achieved if the free ends of the first limb are provided with knobs or claws projecting radially outwards. Such knobs or claws result in point-like contacts and thus relatively high contact pressures per unit area. This in turn leads to a good frictional connection.

Known pipe couplings generally have two anchoring elements arranged as a rule symmetrically to one another. The force transmission is therefore effected via the housing. In an expedient solution, two elements which are arranged axially a distance apart, are directed opposite to one another and are L-shaped in cross-section are connected integrally to one another via the first limbs extending in the axial direction. The axial force is no longer transmitted via the housing but directly in the anchoring element itself.

For flexibility in the production and the mounting of the anchoring element, the slots advantageously extend over the entire width of the anchoring element. The anchoring element blank can therefore be produced continuously as a product sold by the meter and cut to the length corresponding to the circumference of the respective pipe coupling.

For the stability of the anchoring element, at least two webs arranged distributed over the length of the slots are expediently provided per slot. By means of two webs, the width of the slots is defined and the stability of the anchoring element ensured.

Three webs arranged distributed uniformly over the length are advantageously provided at each slot. Thus, one web is present in the middle and the other two webs can be arranged further outwards or inwards at the slots, depending on requirements.

The anchoring element is expediently substantially in the form of a slotted sleeve, one end being provided in the region of the longitudinal slot with a tongue gripping over or under the other end. The tongue permits adaptation of the pipe coupling to different external pipe diameters and prevents the formation of an open slot through which the sealing element can be pressed outwards.

When viewed in the circumferential direction, the tongue is advantageously curved. Consequently, the tongue can slide readily over or under the opposite end of the longitudinal slot.

The anchoring element according to the invention is expediently produced by first cutting out or stamping a contour, then applying any profiling, bending over the second limbs and then rounding the anchoring element.

BRIEF DESCRIPTION OF THE DRAWINGS

The invention is to be explained in more detail below with reference to drawings which reproduce it by way of example.

FIG. 1 depicts, in partial sectional view, a pipe coupling having two anchoring elements, in which view at the top of the pipe the anchoring elements are shown in isolation;

FIG. 2 shows an anchoring element of the pipe coupling shown in FIG. 1, in perspective view;

FIG. 3 shows a longitudinal section through a variant of the anchoring element shown in FIGS. 1 and 2;

FIG. 4 shows a further variant of the anchoring element, in longitudinal section;

DETAILED DESCRIPTION

Figure 5:
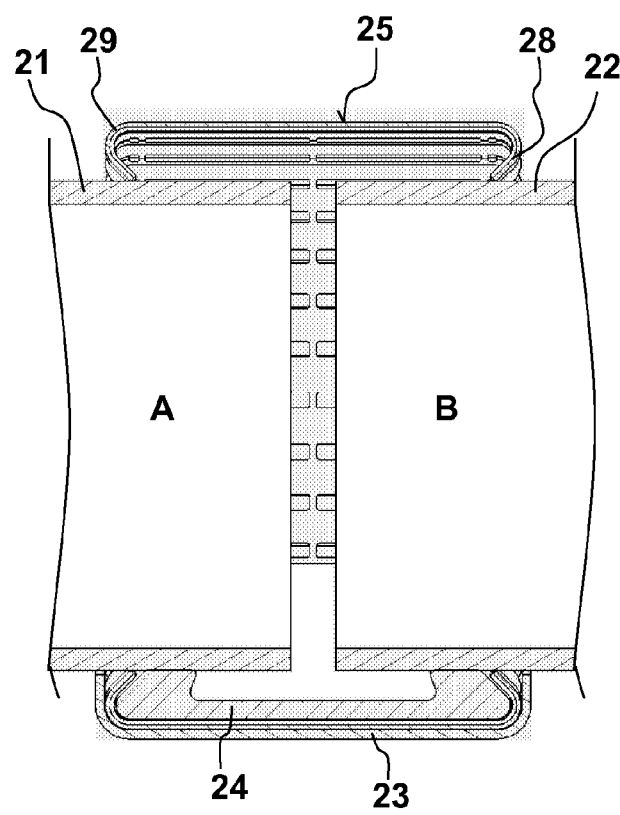
FIG. 5 depicts, in partial sectional view, a pipe coupling with another anchoring element according to the invention, in which view at the top of the pipe the anchoring element is shown in isolation.

The list of reference numerals is part of the disclosure.

The pipe coupling shown in FIG. 1 serves for connecting two smooth-ended pipes 1 and 2. The pipe coupling is mounted over the abutment point between the two pipes 1, 2. The pipe coupling consists of a housing 3 which is C-shaped in longitudinal section and a sealing element 4 arranged therein and likewise approximately C-shaped. The sealing element 4 consists of a rubber-elastic material which is preferably resistant to the pipe medium. Two anchoring elements 5, 6 which may also be referred to as seal anchors, are arranged between the seal 4 and the housing 3. The seal anchors 5, 6, have, in longitudinal sectional, a first limb 7 extending in the axial direction and a second limb 8 extending at an acute angle to the first limb 7. The transition between the limbs 7, 8 is in the form of radius 9.

The seal anchors 5, 6 serve for transmitting the axial forces and are supported in the axial direction on the lateral flanks on the housing 3. As shown in particular in FIG. 2, the anchoring elements 5, 6 are provided with slots 10 running in the longitudinal direction. These slots 10 extend from the second limb 8 beyond the radius 9 into the first limb 7 and provide high flexibility of the anchoring elements 5, 6. The anchoring elements 5, 6 thus consist of a multiplicity of tooth segments connected to one another. In order to obtain a certain dimensional stability of the anchoring elements 5, 6, deformable webs 11 are present in the region of the slots 10. These webs 11 can, if required, be compressed or extended and permit adaptation of the diameter to the pipes 1, 2 to be connected.

FIG. 3 shows a variant of an anchor 13 which has a first limb 14 and a second limb 15. The free end of the first limb 14 is provided with knobs 16. Instead of knobs 16, it is also possible to provide sharp claws. These knobs 16 or claws form a point-like contact or an engagement on the inside of the housing 3 and thus substantially prevent an unintended relative rotation between these two parts.

The anchor 17 shown in FIG. 4 has, in the longitudinal section, a first limb 18 and a second limb 19 connected thereto. The first limb 18 is provided with a curvature 20 towards the pipe axis. This curvature 20 has an effect similar to the knobs 16 in the embodiment shown in FIG. 3. On tensioning of the pipe coupling, the second limb 19 is moved in the clockwise direction. As a result of the point-like contact in the region of the transition between the two limbs 18, 19, the free end of the first limb 18 is also pressed outwards against the wall of the housing.

The version shown in FIG. 5 for a pipe coupling for connecting two pipes 21, 22 likewise has a housing 23 and a sealing element 24 arranged therein. In contrast to the versions shown in FIGS. 1 to 4, however only a single anchoring element 25 is provided. In principle this embodiment is formed by connecting two anchors according to FIGS. 1 to 4 integrally to one another. This has the advantage that the force transmission takes place within the anchoring element itself and the housing is therefore relieved. This permits the use of housings having a smaller wall thickness and hence a considerable saving of materials.

Figure 6:
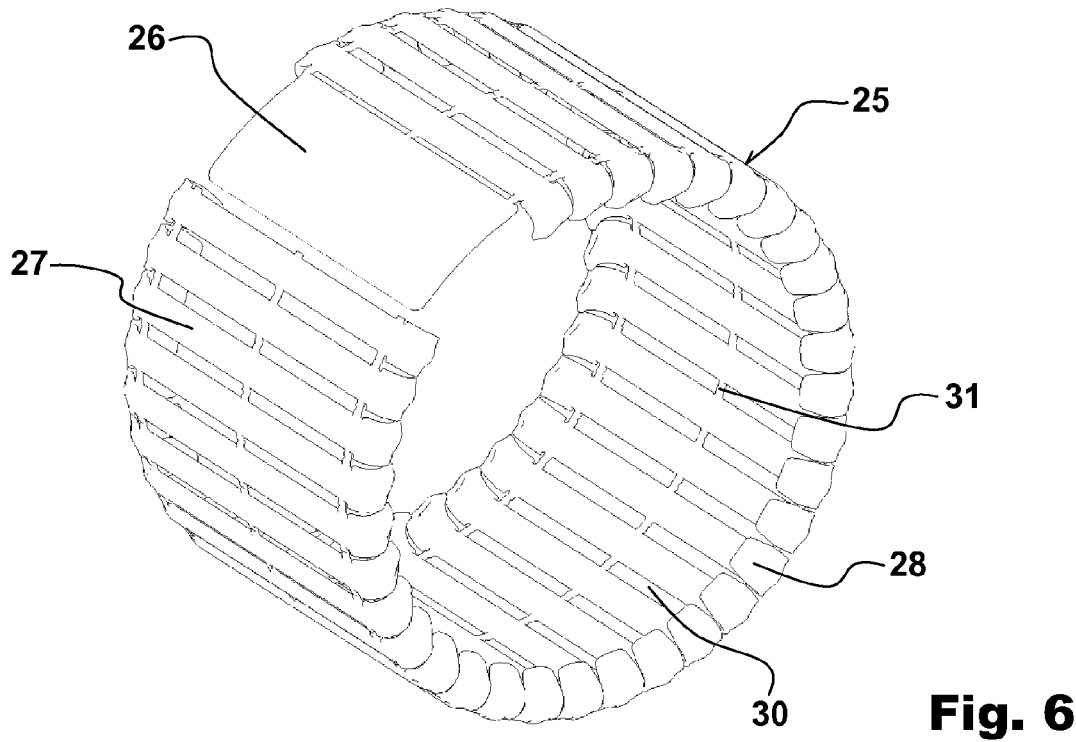
FIG. 6 shows an anchoring element according to FIG. 5, in perspective view.

FIG. 6 clearly shows the sleeve-like, longitudinally slotted formation of the anchor 25 having a tongue 26 which bridges the seal anchor ends. The tongue 26 can grip over or under the opposite side of the seal anchor. This overlap makes it impossible for the sealing element 24 to be pressed out radially in the region of the seal anchor ends by the internal pressure. It is also clearly evident that slots 30 arranged distributed over the total circumference and running in the axial direction extend substantially over the total width. Deformable webs 31 which produce the connection between the individual first limbs 27 are arranged in the region of the slots 30. On tensioning of the pipe coupling, the webs 31 may be compressed or extended.

Figure 7:
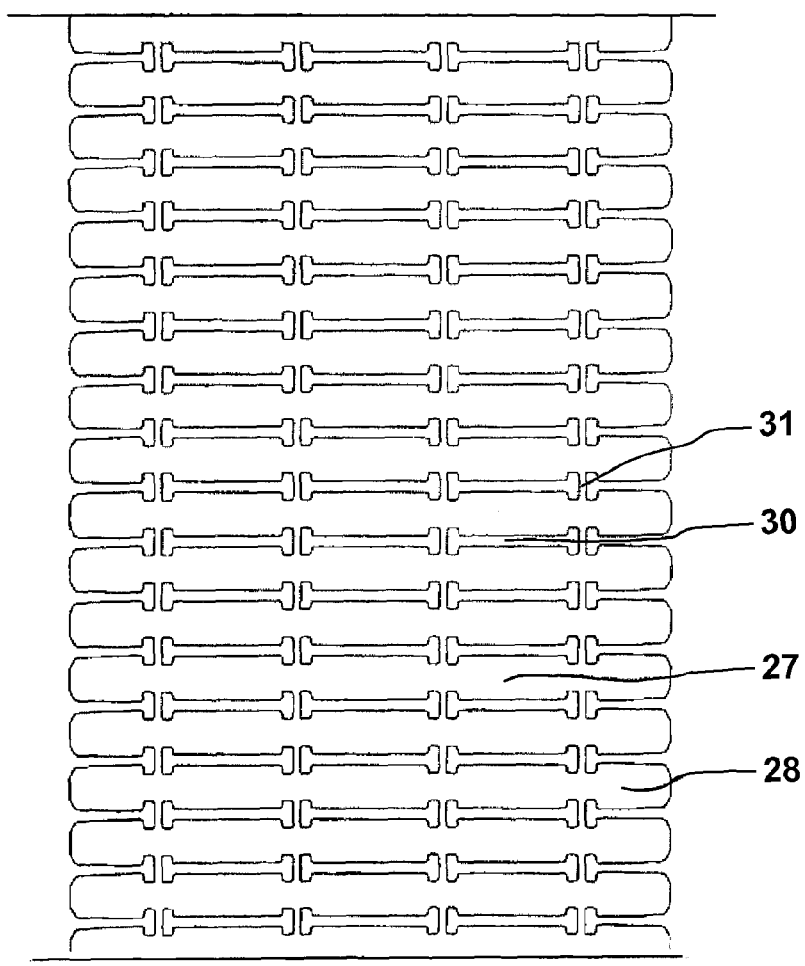
FIG. 7 shows a view of an extended blank of the anchoring element according to FIGS. 5 and 6.

FIG. 7 shows the extended blank of an anchor 25 according to FIGS. 5 and 6. This blank can be produced, for example, by a continuous stamping process. As a result of the slots 30 running between the limbs 27, 28, the resulting strip is very flexible and can be easily rolled up as a product sold by the meter with deformation of the webs 31. For fabrication of the anchoring elements, the length corresponding to the circumference is then cut off the strip.

LIST OF REFERENCE NUMERALS 1, 2 Pipe
3 Housing
4 Seal
5 Anchoring element (L-shaped)
6 Anchoring element (L-shaped)
7 First limb
8 Second limb
9 Radius
10 Slot
11 Web
12 Profile
13 Anchoring element (L-shaped)
14 First limb
15 Second limb
16 Knobs
17 Anchoring element (L-shaped)
18 First limb
19 Second limb
20 Curvature
21, 22 Pipe
23 Housing
24 Sealing element
25 Anchoring element (C-shaped)
26 Tongue
27 First limb
28 Second limb
29 Radius
30 Slot
31 Web

What is claimed is:

1. A pipe coupling comprising:

a housing;

in said housing, a first seal anchor configured to engage a pipe, said anchor having a generally L-shaped cross-section;

said anchor having a first limb segment extending in a generally axial direction relative to pipe connected by the pipe coupling;

said anchor having a second limb segment extending at an acute angle to said first limb segment;

a transition between said first limb segment and said second limb segment, said transition being an arcuate segment with radius;

a plurality of open-gap slits provided in said second limb segment, said open-gap slits running in a longitudinal direction and extending through said transition and through said first limb segment, said open-gap slits extending over the total width of said anchor;

a plurality of first limbs defined by said open-gap slits in said first limb segment;

a plurality of second limbs defined by said open-gap slits in said second limb segment;

each said open-gap slit having at least one respective deformable web running substantially transversely to said respective open-gap slit, and located intermediate to ends of said respective open-gap slit; and, a seal configured to frictionally connect pipes, said seal having an external end enclosed by said anchor, and said seal being arranged in said housing.

2. The pipe coupling as claimed in claim 1, wherein:
said limbs have, in cross-section, profiles at least over a part of length.

3. The pipe coupling as claimed in claim 1, wherein:
at least one of said first limbs is at least partly curved towards a pipe axis.

4. A pipe coupling as claimed in claim 1, further comprising:
a free end on at least one of said first limbs; and,
said free end having a knob projecting radially outwards.

5. A pipe coupling as claimed in claim 1, further comprising:
a free end on at least one of said first limbs; and,
said free end having a claw projecting radially outwards.

6. A pipe coupling as claimed in claim 1, further comprising:
two respective deformable webs distributed over a length of at least one of said open-gap slits.

7. A pipe coupling as claimed in claim 1, further comprising:
at least three respective deformable webs distributed over a length of at least one of said open-gap slits.

8. A pipe coupling as claimed in claim 1, further comprising:
one end of said anchor provided with a tongue configured to grip circumferentially over or under the other end of said anchor.

9. The pipe coupling as claimed in claim 8, wherein:
said tongue is curved.

10. A pipe coupling as claimed in claim 1, further comprising:
a second seal anchor axially spaced from said first anchor, said second anchor having a generally L-shaped cross-section;
said second anchor integrally connected with said first anchor via said first limb segment; and,
said second anchor having a third limb segment extending at an acute angle to said first limb segment.

11. The pipe coupling as claimed in claim 1, wherein:
said web is deformable under either tensile stress or compressive stress.

12. The pipe coupling as claimed in claim 11, wherein:
said web is elastically deformable.

13. A pipe coupling comprising:
a housing;
in said housing, a first seal anchor configured to engage a pipe, said anchor having a generally C-shaped cross-section;
said anchor having a first limb segment extending in a generally axial direction relative to pipe connected by the pipe coupling;
said anchor having a second limb segment extending at an acute angle to said first limb segment;
a transition between said first limb segment and said second limb segment, said transition being an arcuate segment with radius;
a plurality of open-gap slits provided in said second limb segment, said open-gap slits running in a longitudinal direction and extending through said transition and through said first limb segment, said open-gap slits extending over the total width of said anchor;
a plurality of first limbs defined by said open-gap slits in said first limb segment;
a plurality of second limbs defined by said open-gap slits in said second limb segment;
each said open-gap slit having at least one respective deformable web running substantially transversely to said respective open-gap slit, and located intermediate to ends of said respective open-gap slit; and,
a seal configured to frictionally connect pipes, said seal having an external end enclosed by said anchor, and said seal being arranged in said housing.

14. The pipe coupling as claimed in claim 13, wherein:
said limbs have, in cross-section, profiles at least over a part of length.

15. A pipe coupling as claimed in claim 13, further comprising:
two respective deformable webs distributed over a length of at least one of said open-gap slits.

16. A pipe coupling as claimed in claim 13, further comprising:
at least three respective deformable webs distributed over a length of at least one of said open-gap slits.

17. A pipe coupling as claimed in claim 13, further comprising:
a second seal anchor axially spaced from said first anchor, said second anchor having a generally C-shaped cross-section;
said second anchor integrally connected with said first anchor via said first limb segment; and,
said second anchor having a third limb segment extending at an acute angle to said first limb segment.

18. The pipe coupling as claimed in claim 13, wherein:
said web is deformable under either tensile stress or compressive stress.

19. The pipe coupling as claimed in claim 18, wherein:
said web is elastically deformable.

20. A pipe coupling as claimed in claim 13, further comprising:
one end of said anchor provided with a curved tongue configured to grip circumferentially over or under the other end of said anchor.

* * * * *